Feb. 16, 1965 B. B. STOCKARD, JR 3,169,433
METAL WORKING MACHINE
Filed Sept. 25, 1962 6 Sheets-Sheet 1
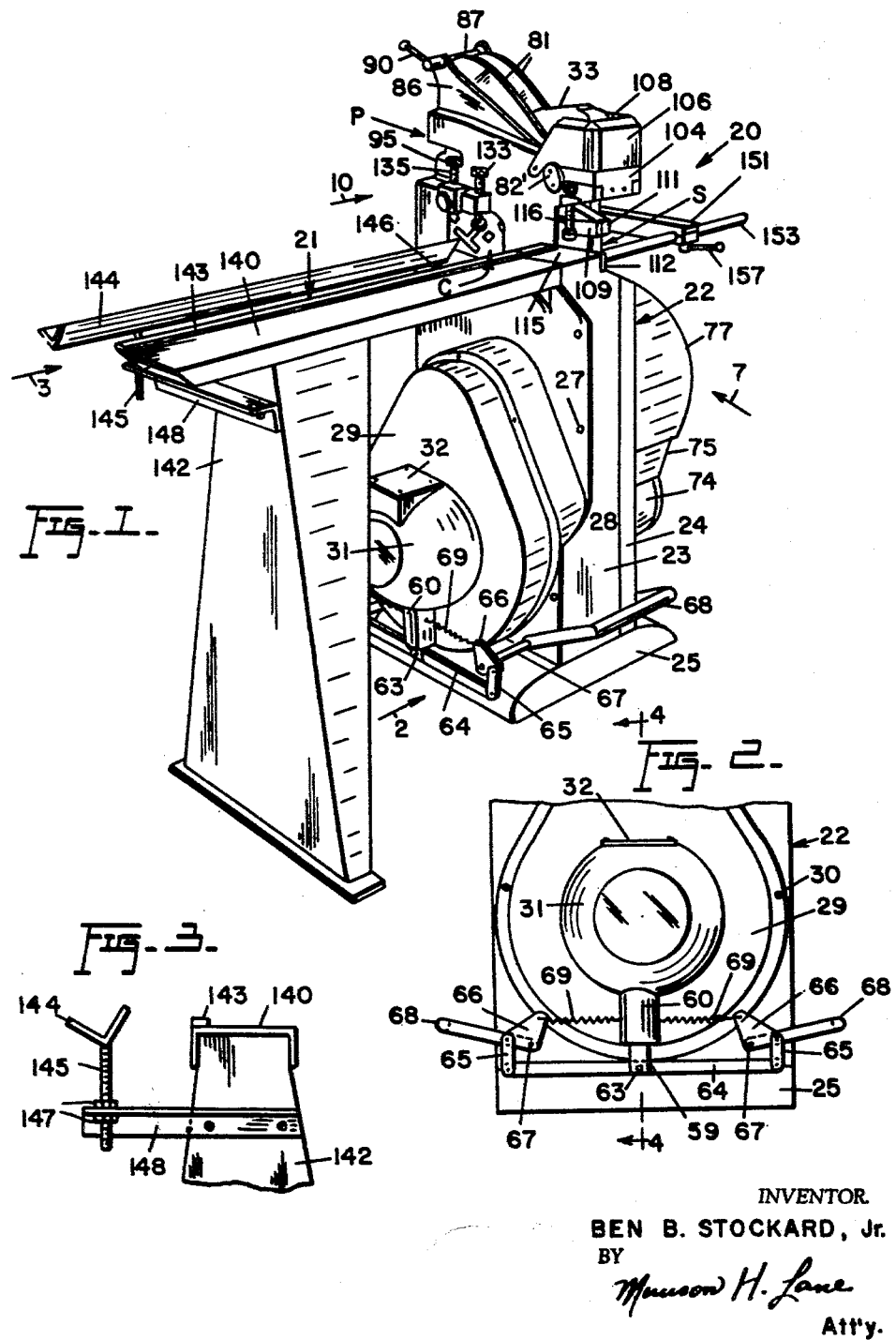
INVENTOR.
BEN B. STOCKARD, Jr.
BY
Munson H. Lane
Att'y.

Feb. 16, 1965   B. B. STOCKARD, JR   3,169,433
METAL WORKING MACHINE
Filed Sept. 25, 1962   6 Sheets-Sheet 2
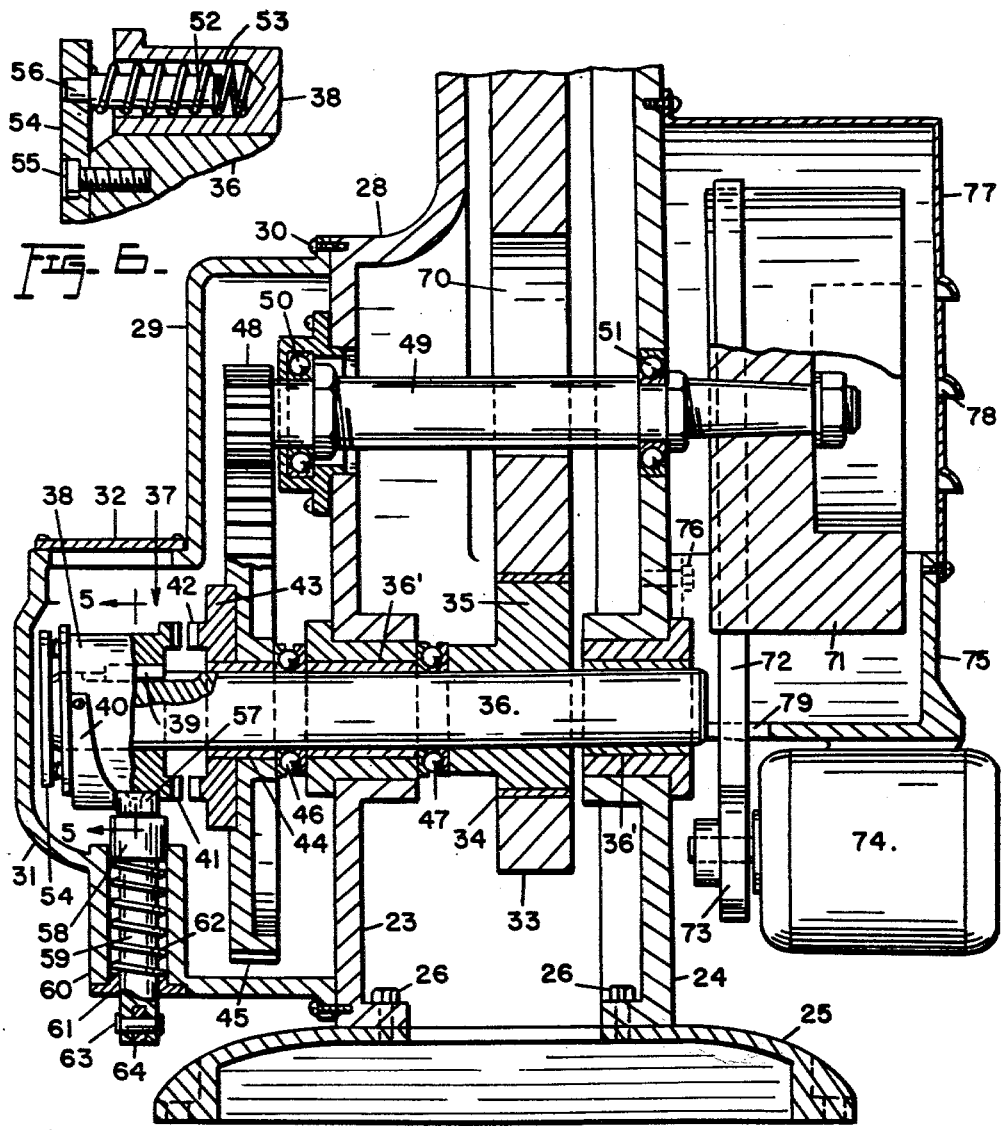
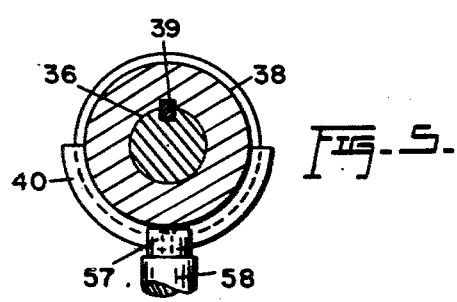
INVENTOR.
BEN B. STOCKARD, Jr.
BY
Munson H. Lane
Att'y.

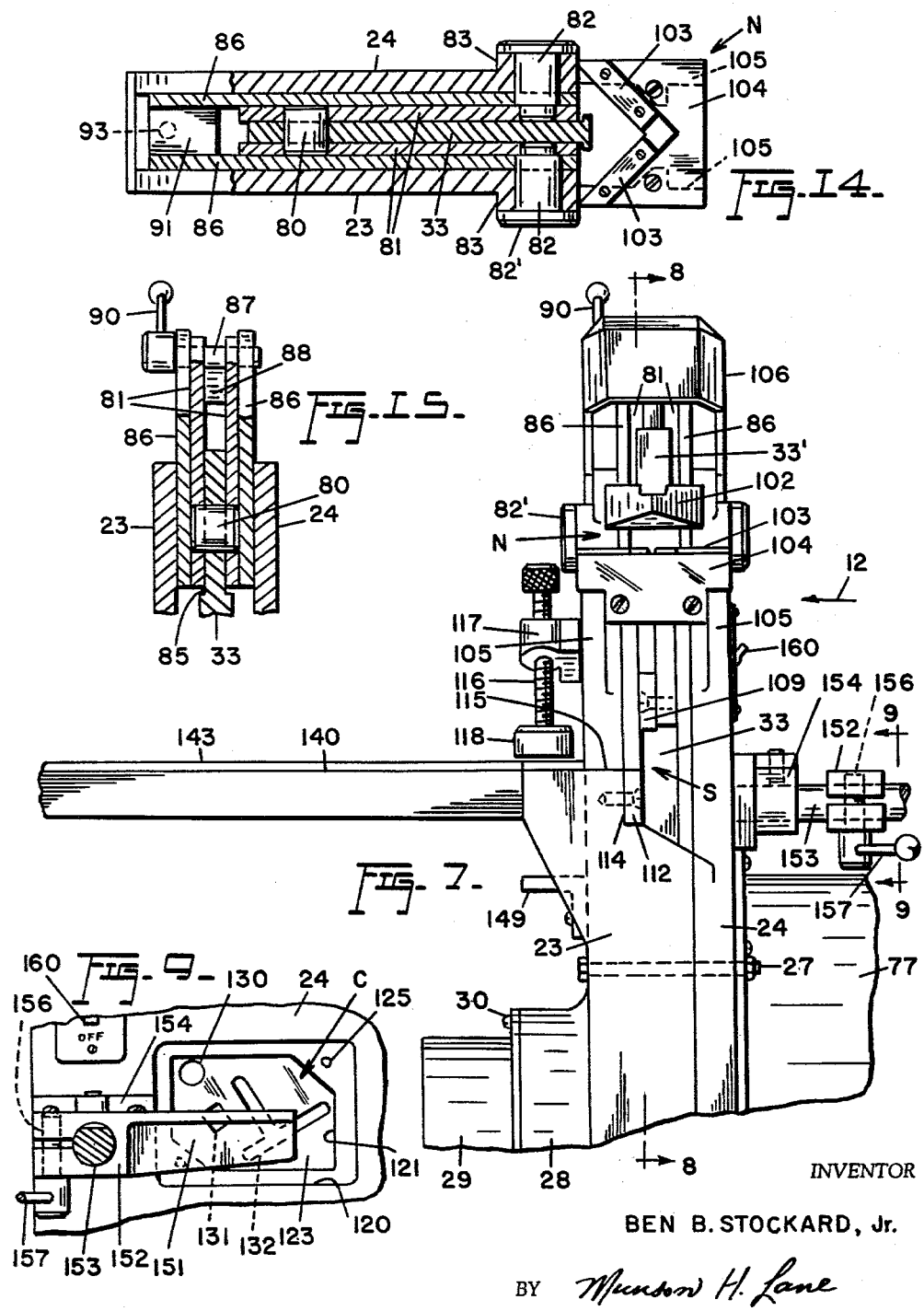

Feb. 16, 1965  B. B. STOCKARD, JR  3,169,433
METAL WORKING MACHINE
Filed Sept. 25, 1962  6 Sheets-Sheet 4
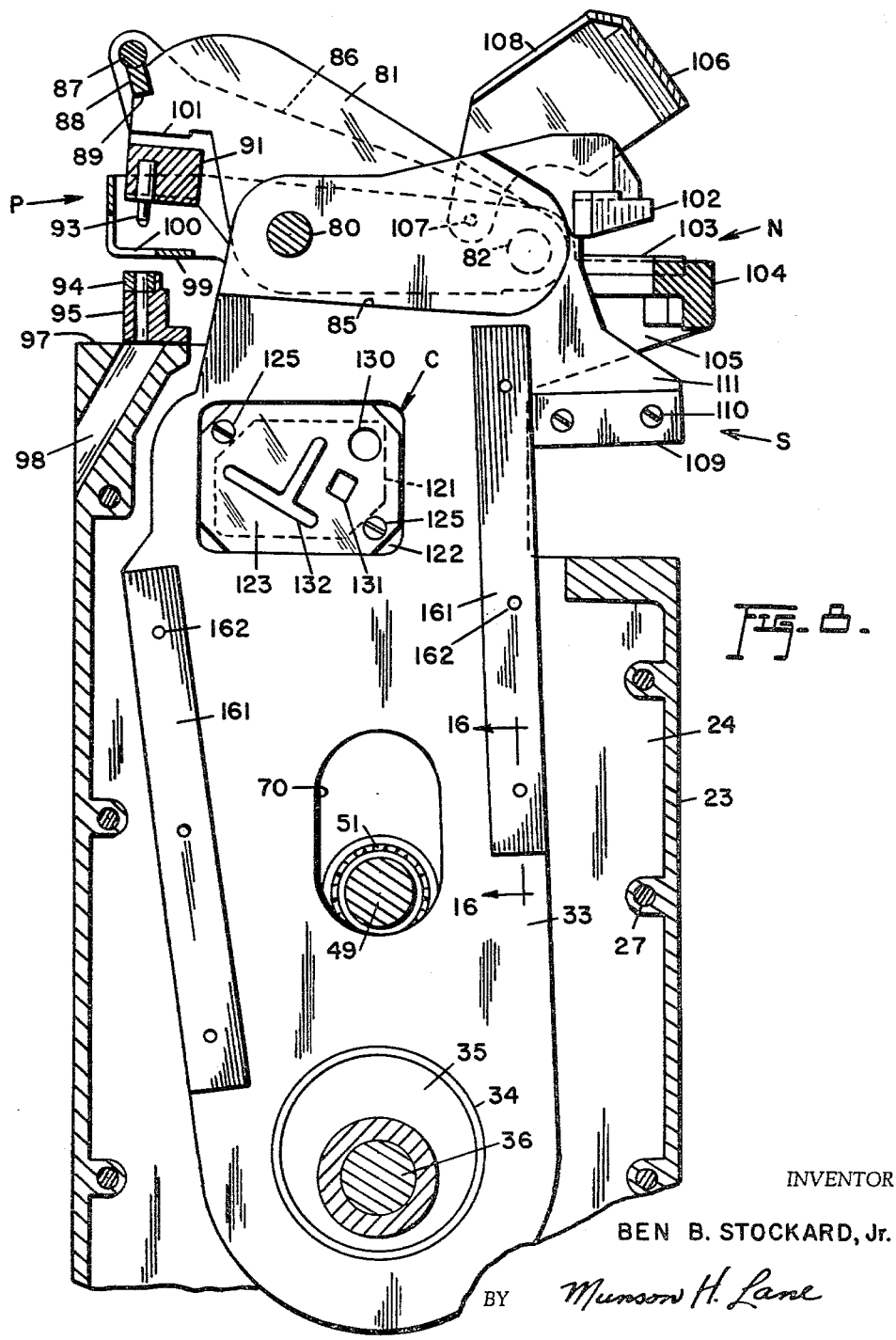
INVENTOR
BEN B. STOCKARD, Jr.
BY Munson H. Lane
ATTORNEY

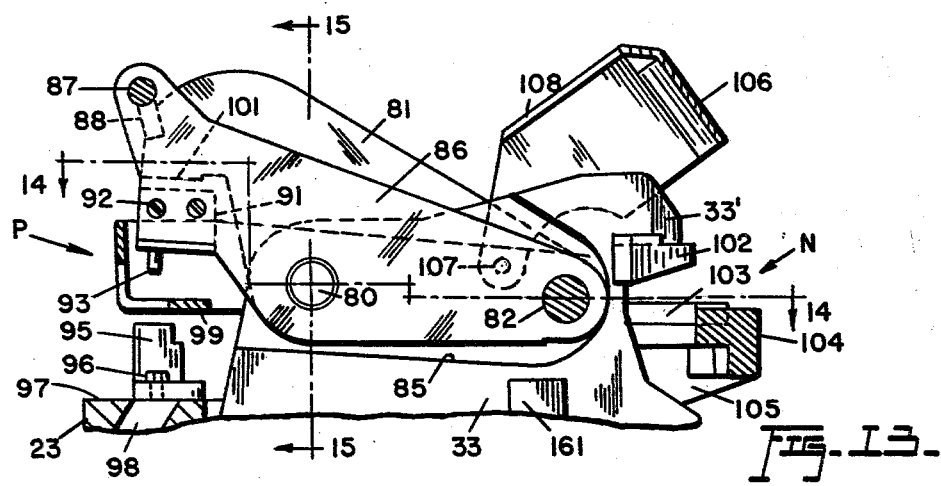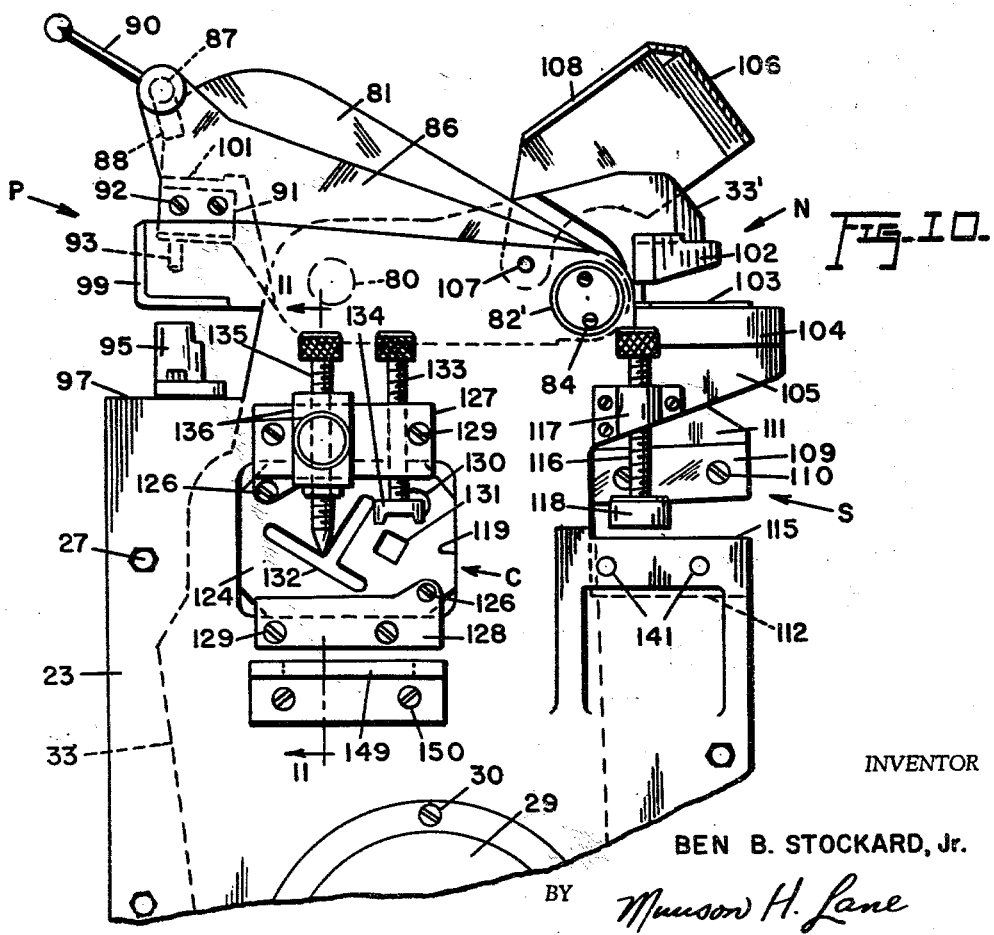

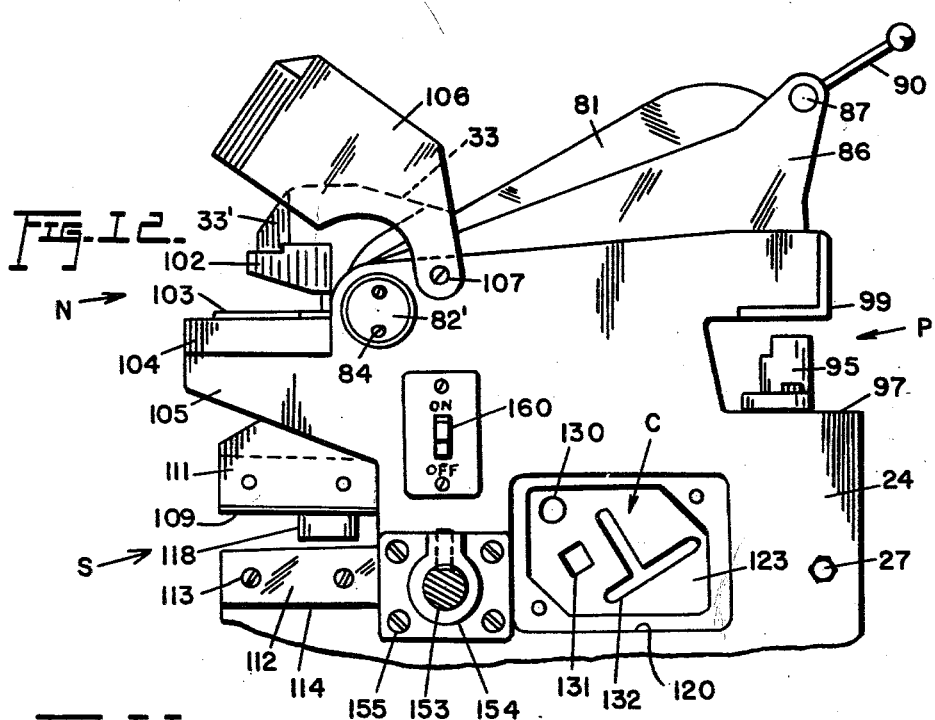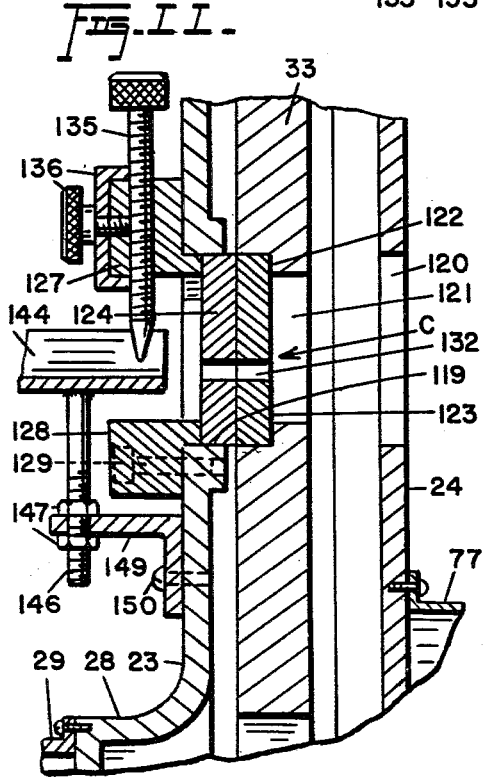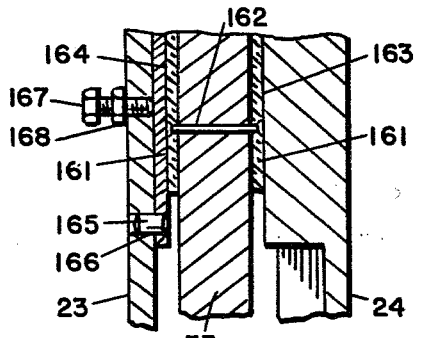

United States Patent Office 3,169,433
Patented Feb. 16, 1965

3,169,433
METAL WORKING MACHINE
Ben B. Stockard, Jr., Greensboro, N.C., assignor to Wysong & Miles Company, Greensboro, N.C.
Filed Sept. 25, 1962, Ser. No. 226,062
6 Claims. (Cl. 83—524)

This invention relates to new and useful improvements in metal working machines, and the principal object of the invention is to provide a highly compact, simple and durable machine which may be effectively employed for performing a variety of metal working operations such as for example, cutting round or flat bar stock, cutting, notching or bevelling angle bars, shearing, punching, and the like.

An important feature of the invention resides in providing the machine with a single movable actuating member which is motor-driven and mounted for a compound translatory movement so that various portions of the member, moving through different distances and in different directions, may be utilized to simultaneously actuate different cutters, et cetera, for performing the various aforementioned operations.

Another important feature of the invention resides in disposing the motor drive of the actuating member in the base portion of the machine, that is, below the various cutters rather than above the same, so that the machine has a low center of gravity and greater accuracy of operation is attained by minimization of vibration. Moreover, the general arrangement of the machine is such that there are no overhanging parts to obscure vision, thus contributing to the safety of the machine's operator.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a perspective view of the metal working machine in accordance with the invention;

FIGURE 2 is a fragmentary elevational view of the lower portion of the machine, taken in the direction of the arrow 2 in FIGURE 1;

FIGURE 3 is a fragmentary end view of the work supports, taken in the direction of the arrow 3 in FIGURE 1;

FIGURE 4 is an enlarged, fragmentary vertical sectional view of the lower portion of the machine, taken substantially in the plane of the line 4—4 in FIGURE 2;

FIGURE 5 is a fragmentary sectional detail, taken substantially in the plane of the line 5—5 in FIGURE 4;

FIGURE 6 is an enlarged fragmentary sectional detail showing a portion of the clutch mechanism;

FIGURE 7 is an enlarged, fragmentary elevational view of the upper portion of the machine, taken in the direction of the arrow 7 in FIGURE 1;

FIGURE 8 is a fragmentary vertical sectional view, taken substantially in the plane of the line 8—8 in FIGURE 7;

FIGURE 9 is a fragmentary sectional detail, taken substantially in the plane of the line 9—9 in FIGURE 7;

FIGURE 10 is an enlarged, fragmentary elevational view of the upper portion of the machine, taken in the direction of the arrow 10 in FIGURE 1;

FIGURE 11 is an enlarged fragmentary sectional view, taken substantially in the plane of the line 11—11 in FIGURE 10;

FIGURE 12 is a fragmentary elevational view of the upper portion of the machine, taken in the direction of the arrow 12 in FIGURE 7;

FIGURE 13 is a fragmentary elevational view, similar to that shown in FIGURE 10 but with the adjacent side of the housing removed;

FIGURE 14 is a sectional view, taken substantially in the plane of the line 14—14 in FIGURE 13;

FIGURE 15 is a fragmentary sectional view, taken substantially in the plane of the line 15—15 in FIGURE 13; and FIGURE 16 is a fragmentary sectional detail, taken substantially in the plane of the line 16—16 in FIGURE 8.

Referring now to the accompanying drawings in detail, the metal working machine in accordance with the invention is designated generally by the reference numeral 20. The machine is vertically elongated and is provided at one side thereof with a work supporting table designated generally by the numeral 21. The work supporting table is removably attached to the machine 20 and will be described hereinafter.

The machine 20 embodies in its construction a vertically elongated housing 22 which consists of a pair of complemental sections 23, 24 mounted on a supporting base 25 by suitable bolts or screws 26 (see FIG. 4). The sections 23, 24 are secured together by transverse bolts 27 (see FIG. 7).

As shown in FIGURE 4, the housing section 23 has its lower portion provided with an enlargement 28 on which is mounted a gear case 29 by suitable screws 30. The gear case 29 has a dome-like enlargement 31 provided with a removable inspection plate 32. The various cutters, et cetera, hereinafter to be described are actuated by a vertically elongated actuating member or plate 33 which is movably disposed within the housing 22. The lower end portion of the actuating plate 33 is provided with an opening having a bushing 34 therein, the bushing rotatably receiving an eccentric 35 which is suitably secured to a driven shaft 36. The latter is rotatably journalled in a pair of bearings 36' provided in the housing sections 23, 24, it being noted that one end portion of the shaft 36 projects into the gear case 29 and dome 31 to carry a dog clutch assembly 37. The clutch assembly includes a sleeve 38 which is slidably but non-rotatably mounted on the shaft 36 by means of a key 39. The sleeve 38 has secured thereto a substantially semi-circular cam segment 40 and is also provided with a set of clutch teeth 41 which are engageable with similar teeth 42 on a coacting clutch member 43 having a hub 44 freely rotatable on the shaft 36. A relatively large gear 45, disposed in the gear case 29, is also mounted on the hub 44 for free rotation with the clutch member 43 on the shaft 36. A pair of end-thrust bearings 46, 47 are provided, respectively, between the hub 44 on one side and the eccentric 35 on the other side of the shaft bearing 36 therebetween, as will be readily apparent.

The gear 45 meshes with and is driven by a pinion 48 on a countershaft 49 which is disposed above the shaft 36 and is rotatably journalled in suitable bearings 50, 51 provided in the housing sections 23, 24. It will be understood that when the clutch sleeve 38 is slid to the left as viewed in FIG. 4, that is, away from the clutch member 43, the clutch teeth 41, 42 will be separated and rotation of the countershaft 49 will cause the gear 45 to rotate freely on the shaft 36, without imparting rotation to the latter. However, when the clutch sleeve is slid toward the member 43 so that the teeth 41, 42 become engaged, rotation of the gear 45 will be transmitted through the engaged teeth to the clutch sleeve 38 and hence to the shaft 36, thus causing the eccentric 35 to impart movement to the actuating plate 33.

The sleeve 38 is biased toward the clutch member 43 by a set of compression springs 52 which extend into blind bores 53 formed in the outer end of the sleeve, as is best shown in FIG. 6. The outer ends of the springs 52 bear against a disc 54 which is secured to the end of the shaft 36 by suitable screws 55. Guide pins 56 are secured to the disc 54 and extend slidably into the springs 52 in the bores 53 so as to prevent the outer end portions of the springs from becoming displaced relative to the disc.

The cam segment 40 is engageable by a rotatable roller 57 mounted on the head 58 of a plunger 59 which is slidably disposed in a tubular guide 60 formed integrally in the bottom portion of the gear case dome 31. A bushing 61 is provided at the lower end of the guide 60 and the plunger 59 projects slidably through this bushing. A compression spring 62 is positioned in the guide 60 around the plunger 59, one end of the spring bearing against the bushing 61 while its other end bears against the plunger head 58 so as to bias the plunger upwardly. The lower end of the plunger is connected by a pivot pin 63 to the midportion of a clutch actuating lever 64, the ends of which are pivotally connected by a pair of links 65 to a pair of triangular plates 66, as is shown in FIGS. 1 and 2. The plates 66 are secured to a pair of shafts 67 which extend transversely through and are rotatably journalled in the lower portion of the housing 22 and U-shaped foot pedals 68 are secured to the shafts 67. The pedals 68 straddle the opposite sides of the housing 22 and it will be apparent that by depressing either one of the two pedals, the associated linkage will cause the plunger 59 to be slid downwardly against the action of the spring 62, thus drawing the roller 57 downwardly away from the clutch sleeve 38 and thereby disengaging the roller from the cam segment 40. As this occurs, the springs 52 will slide the sleeve 38 toward the clutch member 43 to engage the clutch teeth 41, 42 and, as a result, the shaft 36 will commence to be driven by the countershaft 49. As the rotation of the shaft 36 commences, the cam segment 40 on the sleeve 38 will turn out of the way of the roller 57 and if at that point the depressed one of the foot pedals 68 is released, the spring 62 will slide the plunger 59 upwardly to bring the roller 57 toward the sleeve 38. With continued rotation of the shaft 36, the cam segment 40 will eventually come in contact with the roller 57 and since the roller cannot be laterally displaced, the contact of the cam segment therewith will cause the sleeve 38 to slide away from the clutch member 43, thus disengaging the teeth 41, 42 and interrupting the drive to the shaft 36. In this manner the clutch 37 functions as a one-revolution clutch, causing the shaft 36 to rotate only through one complete revolution when either of the pedals 68 is depressed and promptly released. However, if the pedal continues to be depressed, rotation of the shaft 36 will also continue until the pedal is released and the clutch is disengaged at the completion of its cycle, as already explained. It is to be noted that the two pedals 68 facilitate actuation of the clutch selectively from either side of the machine. Suitable tension springs 69 extend from the plates 66 to the guide 60 as shown, to assist the spring 62 in returning the plunger 59 and the pedals 68 to their raised positions.

The countershaft 49 passes freely through an opening 70 formed in the plate 33 so that it does not interfere with the movement imparted to the plate by the eccentric 35. The countershaft projects through the bearing 51 to the outside of the housing section 24 and has secured thereto a suitable flywheel 71, driven by an endless belt 72 from a pulley 73 on the armature shaft of an electric motor 74. The latter is suspended from a casing 75 which is secured exteriorly to the housing section 24 as at 76 (see FIG. 4). The casing 75 accommodates the lower portion of the flywheel 71, while a cover 77, attached to the casing 75 and to the housing section 24, serves to completely enclose the flywheel. The cover 77 may be provided with ventilating slots 78 and it will be noted that the bottom of the casing 75 is formed with an opening 79 to facilitate passage of the belt 72 from the flywheel to the motor pulley 73.

The gear case 29 and dome 31 may contain a quantity of lubricant for the gear and clutch mechanism therein, if so desired.

With reference now to FIGS. 8, 10 and 13-15, it will be noted that the upper end portion of the actuating member or plate 33 is pivotally attached by means of a pin 80 to a pair of punch actuating plates 81 which are disposed at opposite sides of the plate 33 and are pivotally mounted on a pair of coaxial pins 82 secured in bosses 83 formed on upper portions of the housing sections 23, 24 (see FIG. 14). The pins 82 are offset laterally from the pin 80 and are equipped with enlarged heads 82' whereby they may be secured to the bosses 83 by suitable screws 84. It will be noted that the opposite sides of the upper portion of the plate 33 are recessed as at 85 to accommodate the plates 81, and that the inner ends of the pins 82 terminate within the thickness of the plates 81 so that the plate 33 is movable therebetween. Accordingly, when movement is imparted to the plate 33 by the eccentric 35, the upper portion of the plate 33 will be guided by its pivotal connection through the pin 80 to the plates 81 which, in turn, will rock about the axis of the pins 82, so that a translatory movement of the plate 33 in a vertical plane will result, such translatory movement being a combined effect or component of both horizontal and vertical motions.

The coaxial pins 82 also have pivotally mounted thereon a pair of punch carrying plates 86 which are sandwiched between the plates 81 and the housing sections 23, 24. The free or outer ends of the plates 86 project beyond the plates 81 and have rotatably journalled therein a cross shaft 87 having a lug 88 secured thereto. The lug 88 is lockingly receivable in notches 89 formed in the outer ends of the plates 81, but may be released therefrom when the shaft 87 is turned by means of a suitable handle 90. A punch supporting block 91 is secured by screws 92 between and to the outer end portions of the plates 86 and is equipped with an interchangeable punch element 93. The latter cooperates with and is receivable in an interchangeable die 94 mounted in a die holder 95. The holder 95 is positioned by suitable screws 96 on a ledge 97 of the machine housing, a suitable passage 98 being provided in the housing for discharge of punchings from the die, as shown in FIG. 8. An angle-shaped stripper 99 is secured to the housing sections 23, 24 to prevent the work from lifting off the die when the punch is raised after a punching operation, the stripper 99 being formed with a suitable passage 100 for the punch element 93.

It is to be observed that the structural arrangement of the punch unit is such that, with the machine in the position shown, the punch element 93 may be retained in its raised position by locking engagement of the lug 88 in the notches 89 of the plates 81, whereby work may be inserted between the die 94 and the stripper 99. The lug 88 may then be disengaged from the notches 89 by actuation of the handle 90, so as to permit lowering of the punch element 93 in contact with the work, this lowering movement being possible by a free pivotal action of the plates 86 on the pins 82 while the plates 81 remain relatively stationary. The punch element may thus be lowered to contact the exact point on the work where the punching is to be made, so that it is not necessary to estimate the point of contact of the punch element with the work, such as it would be if the punch element remained in its raised position until the commencement of the actual punching operation. In any event, when the machine is energized by depression of either of the foot pedals 68, the plates 81 will be drawn downwardly by the translatory movement of the plate 33 and when downwardly facing edge portions 101 of the plate 81 come in contact with the upper surface of the punch supporting block 91, the punch element 93 will be cause to punch the work. It will be also noted that if the punch element is not manually lowered to contact the work prior to the punching operation as above described, that is, if the lug 88 remains in engagement with the notches 89 in the plates 81, the punching operation may still be undertaken inasmuch as downward movement of the plates 81 will cause the entire punch unit including the plates 86 and punch block 91 to go through the punching cycle.

Located on the relatively opposite side of the machine from the punch unit just described is a mechanism which may be used for notching or bevelling flat bars, angles, or other similar work. This mechanism comprises an interchangeable V-shaped cutter 102 which is suitably secured to a nose portion 33' of the plate 33 and cooperates with a pair of blades 103 mounted in V-formation in a blade holder 104, as is best shown in FIGURE 14. The blade holder 104 is removably attached to and carried by a pair of transversely spaced, finger-like projections 105 provided on the housing sections 23, 24, and when the machine is energized, the translatory movement of the actuating plate 33 will cause the cutter 102 to be lowered between the blades 103 for notching or bevelling the work. To avoid any possibility of cut fragments of the work flying off and injuring the operator, a box-like hood or cover 106 is pivotally attached to the housing sections 23, 24 as at 107 and may be swung to the position shown in FIGURE 1 wherein it covers the cutter 102 and the underlying work on the blades 103. The hood, of course, may also be swung upwardly out of the way to facilitate placing of the work in the machine. It will be noted that the top of the hood 106 is recessed as at 108 to provide clearance for the portion of the plate 33 adjacent the nose 33', as shown in FIGURE 1.

Located on the same side of the machine as the bevelling or notching mechanism 102, 103, but somewhat below the same is a shearing mechanism such as may be used for cutting bar stock, sheet metal, and the like. This mechanism comprises a relatively movable shearing blade 109 which is removably fastened by suitable screws 110 to another nose-like projection 111 formed on the actuating plate 33. The movable blade 109 cooperated with an relatively stationary blade 112 which is attached by suitable screws 113 to the housing section 23, the stationary blade 112 being fitted in a recess 114 which is provided therefor in the housing section 23, as is best shown in FIG. 7. The work to be sheared by the blades 109, 112 may be clamped against a platform 115 provided on the housing section 23 flush with the upper edge of the stationary blade 112, such clamping action being performed by a clamping screw 116 mounted in a screw-threaded block 117 on one of the aforementioned projections 105. The lower end of the screw 116 is equipped with a work engaging pad 118 and when the work is clamped thereby, it is held in proper position to be sheared by the blades 109, 112. It may be noted that on the outer side of the blades, that is, the side opposite from the clamping screw, the housing is recessed as is best shown in FIGURE 7, so that the work may be readily manipulated.

For purposes of convenient identification, the various work performing means thus far described may be designated as the punch means P, the bevelling or notching means N, and the shearing means S. In addition, the machine embodies cutting means C which may be used for cutting off lengths of round or rectangular bars, angle bars, and the like. While the means P, N and S are disposed more-or-less around the sides of the machine, the cutting means C are operative transversely through the machine, for which purpose the housing sections 23, 24 are provided with transversely aligned recesses 119, 120, respectively, which are substantially rectangular in form and are in substantial alignment with a similar recess 121 formed in the plate 33, as is best shown in FIG. 11. The plate recess 121 is provided with a perimetric seat 122 for a replaceable blade 123 which cooperates with a similar blade 124 fixedly mounted in the recess 119 of the housing section 23. The blade 123 is mounted in the seat 122 in the plate 33 by suitable screws 125 (see FIG. 8), while the fixed blade 124 is mounted in the housing recess 119 by suitable screws 126 (see FIG. 10) provided in a pair of blade holders 127, 128. These holders are disposed at the respective upper and lower edges of the recess 119 and are secured to the housing section 23 by suitable screws 129. Suitable means (not shown) may be provided for shimming, adjusting or otherwise setting the blade 124 in the recess 119 so that it is in proper contacting and shearing relationship with the blade 123 in the member 33 as shown in FIGURE 11. The two coacting blades 123, 124 are provided with registrable apertures 130 to receive round bar stock, square openings 131 to receive square bar stock, and T-shaped recesses 132 to receive angle bars, so that when the machine is in operation and work of a given cross-section is inserted into the appropriate aperatures, openings or recesses, it will be effectively sheared.

A suitable clamping screw 133 is provided on the blade holder 127 and equipped with a pad 134 to engage work inserted in the aperatures 130 or openings 131, while a similar clamping screw 135 is also carried by the holder 127 to engage an inside corner of an angle bar inserted in the recesses 132. The screw 135 has a pointed lower end and is adjustable laterally of the holder 127 by suitable means 136 to assure proper engagement of its pointed lower end with the inside corner of the work.

The aforementioned work supporting table 21, which may be regarded as an attachment or an accessory for the machine proper, comprises a horizontally extending, elongated bed 140 which may be in the form of an inverted U-shaped channel, having one end thereof secured by suitable screws (not shown) to the housing section 23, flush with the platform 115. The attachment screws of the bed 140 may be received in threaded apertures 141 formed in the housing section 23, as shown in FIGURE 10. The other or outer end of the bed 140 is supported by a suitable leg 142 (see FIGS. 1 and 3), and a guiding strip 143 is secured to one longitudinal edge of the bed 140, so that flat bar stock or sheet metal stock may be rested on the bed and held against the guiding strip 143 while being cut by the shearing blades 109, 112.

The work supporting table 21 also includes a channel-shaped guide 144 which is in longitudinal alignment with the recesses 132 in the cutting blades 123, 124 and is adjustable supported by a pair of screw-threaded, vertical rods 145, 146, secured at their upper ends by welding, or the like, to the corner portion of the guide. The rod 145 is adjustably secured by suitable nuts 147 in a slot formed in a horizontal angle bar 148 secured to the leg 142. The rod 146 is similarly secured by the nuts 147 to an angle bracket 149 which is attached by screws 150 to the housing section 23 (see FIG. 11).

As another attachment or accessory for the machine, a material stop 151 is provided at the side of the machine adjacent the housing section 24. The stop 151 is in the form of an angle bar having a split block 152 at one end thereof for adjustable positioning on a horizontal rod 153 which has one end thereof secured in a boss 154 attached by screws 155 to the housing section 23. The split block 152 is equipped with a clamp screw 156 having a handle 157 thereon, so that when the screw 156 is tightened, the stop 151 may be locked in a desired position on the rod 153. However, upon loosening of the screw 156, the stop 151 may be adjusted both by sliding the same longitudinally on the rod 153 and by turning the same about the axis of the rod, so that it is in alignment with and at a desired distance from the blade openings 130, 131, 132. With the stop 151 locked in an adjusted position, work may be passed through the blade openings to abut the stop 151 at a predetermined distance to cut off a predetermined length of the work.

An electric switch 160 may be mounted at a suitable location in the machine housing to control the operation of the motor 74, as will be readily apparent.

Referring again to the actuating plate 33, although this plate is guided by the plates 81 in the translatory movement which is imparted thereto by the eccentric 35, it is desirable to provide means for stabilizing the plate 33 in a direction parallel to the axis of the shaft 36, whereby to prevent the plate 33 from chattering or vibrating during its translatory movement, especially at points where any one of the various work performing means P, N, S and C comes in contact with the work. Such stabilizing means, as shown in FIGS. 8 and 16, comprise two pairs of strips 161 of suitable wear-resistant material, as for example, material which is commercially known as "Micarta." These strips are secured, as for example by rivets 162, to opposite side edge portions of the opposite faces of the actuating plate 33. At one side of the plate 33, the "Micarta" strips 161 slidably engage flat, elongated abutments or ways 163 which are formed integrally with the housing section 24. On the relatively opposite side of the plate 33 the "Micarta" strips are in sliding engagement with a pair of gibs 164 which are interposed between the "Micarta" strips on that side of the plate and the housing section 23. The gibs 164 are provided with keeper pins 165 which are slidably received in apertures 166 formed in the housing section 23. Adjustable screws 167, equipped with lock nuts 168, are provided in the housing section 23 to bear against the gibs 164 and press the latter against the "Micarta" strips 161 on the adjacent side of the plate 33, thus similarly pressing the "Micarta" strips on the relatively opposite side or face of the plate 33 against the ways 163 on the housing section 24. By proper adjustment of the screws 167 lateral play of the "Micarta" strip-equipped plate 33 between the gibs 164 and ways 163 is eliminated, so that the plate is not subjected to chattering of vibrating during its translatory movement.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the appended claims.

What is claimed as new is:

1. In a metal working machine, the combination of a support, a horizontal fulcrum provided thereon, a tool actuator swingably mounted on said fulcrum for raising and lowering movement, rotatable eccentric means, a link actuated by said eccentric means and pivotally connected to said actuator for raising and lowering the same when the eccentric means are rotated, a tool carrier swingably mounted on said fulcrum for raising and lowering movement independently of said tool actuator, a stationary tool member provided on said support, and a coacting tool member provided on said carrier, said carrier with said coacting tool member being lowerable to a work pre-locating position on said stationary tool member while said actuator remains in a raised position, said actuator having an impact head engageable with said coacting tool member for driving the latter into working cooperation with the stationary tool member when the actuator is lowered.

2. The device as defined in claim 1 together with means for releasably retaining said carrier with said coacting tool member in a raised position when said actuator is raised.

3. The device as defined in claim 2 wherein said last mentioned means comprise a manually operable latch member movably mounted on said carrier and engageable with a seat formed in said actuator when the actuator is raised, said latch member being automatically dislodged from said seat when the actuator is lowered.

4. In a metal working machine, the combination of a housing including a pair of spaced parallel side plates, a pair of coaxial and axially spaced fulcrum pins provided on the respective side plates of said housing, the axis of said fulcrum pins being horizontal, a tool actuator swingably mounted on said fulcrum pins for raising and lowering movement, said actuator including a pair of spaced side members positioned on the respective fulcrum pins and an impact head connecting the side members together at a point remote from the fulcrum pins, a rotatable eccentric provided between the side plates of said housing, a link having one end portion thereof mounted on said eccentric for actuation thereby, the other end portion of said link extending into the space between said side members of said actuator, a pivot pin connecting said other end portion of said link to said side members for raising and lowering the actuator when said eccentric is rotated, a tool carrier swingably mounted on said fulcrum pins for raising and lowering movement independently of said actuator, said carrier including a pair of spaced side pieces positioned on the respective fulcrum pins and interposed between the respective side members of said actuator and the respective side plates of said housing, a stationary tool member provided on the housing, and a coacting tool member supported by the side pieces of said carrier, said carrier with said coacting tool member being lowerable to a work pre-locating position on said stationary tool member while said actuator remains in a raised position, and said impact head of the actuator being engageable with said coacting tool member for driving the latter into working cooperation with the stationary tool member when the actuator is lowered.

5. The device as defined in claim 4 together with means for releasably retaining said carrier with said coacting tool member in a raised position, said means comprising a manually operable latch member movably mounted between the side pieces of said carrier and engageable with seats formed in the side members of said actuator when the actuator is raised, said latch member being automatically dislodged from said seats when the actuator is lowered.

6. The device as defined in claim 5 together with a cross shaft rotatably journalled in said side pieces and having said latch member secured thereto, and a manually operable element provided on said cross shaft for rotating the same, said element being gravity-biased for urging said latch member into said seats when said actuator and said carrier are in their raised position.

References Cited in the file of this patent

UNITED STATES PATENTS

| | | |
|---|---|---|
| 678,784 | Johnston | July 16, 1901 |
| 924,251 | Liebig et al. | June 8, 1909 |
| 975,112 | Bilcsik | Nov. 8, 1910 |
| 993,284 | Wachter | May 23, 1911 |
| 1,831,447 | Heinrich | Nov. 10, 1931 |
| 1,842,229 | Achard | Jan. 19, 1932 |
| 2,039,090 | Kruse et al. | Apr. 28, 1936 |
| 2,110,862 | Hart | Mar. 15, 1938 |
| 2,390,655 | Lago | Dec. 11, 1945 |
| 2,516,017 | Perry | July 18, 1950 |
| 2,620,031 | Swift | Dec. 2, 1952 |
| 2,644,520 | Nelson | July 7, 1953 |
| 2,913,926 | Hammond | Nov. 24, 1959 |

FOREIGN PATENTS

| | | |
|---|---|---|
| 1,325 of 1866 | Great Britain | May 9, 1866 |
| 627,052 | France | May 28, 1927 |